United States Patent

Meadows

[11] Patent Number: 5,827,458
[45] Date of Patent: Oct. 27, 1998

[54] CONTINUOUS METHOD OF MAKING STRUCTURAL FOAM PANELS

[75] Inventor: James A. Meadows, Bolivar, Tenn.

[73] Assignee: Paul F. Janssens-Lens, Marco Island, Fla.

[21] Appl. No.: 590,669

[22] Filed: Jan. 24, 1996

[51] Int. Cl.⁶ ............................ B29C 44/06; B29C 44/24
[52] U.S. Cl. ........................ 264/46.2; 264/46.5; 264/145; 264/157
[58] Field of Search .................... 264/46.3, 45.8, 264/46.1, 145, 157, 46.5, 46.2

[56] References Cited

U.S. PATENT DOCUMENTS

| | | | |
|---|---|---|---|
| 3,792,141 | 2/1974 | Offutt | 264/46.3 |
| 3,846,524 | 11/1974 | Elmore et al. | 264/46.5 |
| 3,867,494 | 2/1975 | Rood et al. | 264/46.3 |
| 4,255,105 | 3/1981 | Hoffmann et al. | 264/46.3 |
| 4,362,678 | 12/1982 | Skowronski et al. | 264/46.3 |
| 5,254,301 | 10/1993 | Sessions et al. | 264/46.3 |
| 5,533,312 | 7/1996 | Mihalcheon | 52/590.1 |

*Primary Examiner*—Allan R. Kuhns
*Attorney, Agent, or Firm*—Reed Smith Shaw & McClay LLP

[57] ABSTRACT

A continuous process for making a structural foam panel with a stiffener is described, and a continuous assembly line for the process is described. The continuous assembly line includes decoilers for decoiling top and bottom skins, uncoilers for releasing top and bottom stiffeners, straighteners for threading and attaching the stiffeners to the skins, respectively, roll formers for shaping both skins and stiffeners into a structural shape, a foam injector for injecting foam between the skins to form an integrated continuous panel, a foam conveyor for pressing the integrated continuous panel, an oven for curing the integrated continuous panel, a clamp and cut-off saw for cutting the continuous panel, and a computer to control the saw to cut the continuous panel into selected kits of discrete panels to assemble selected buildings.

4 Claims, 5 Drawing Sheets

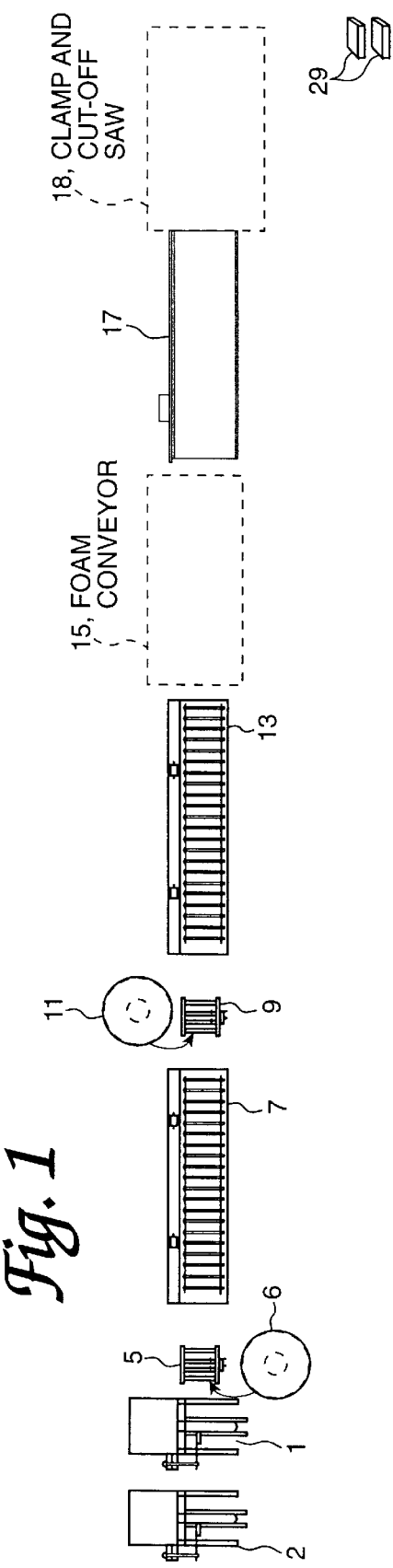
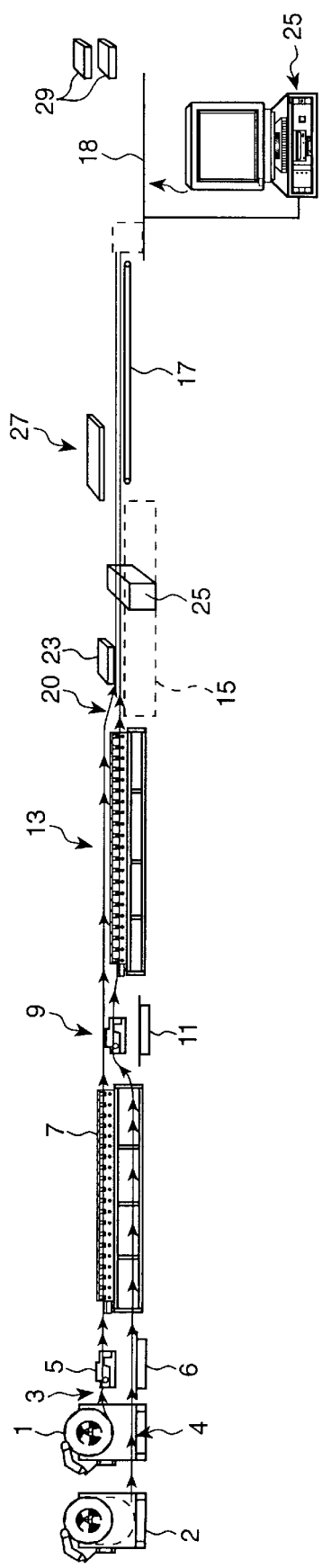

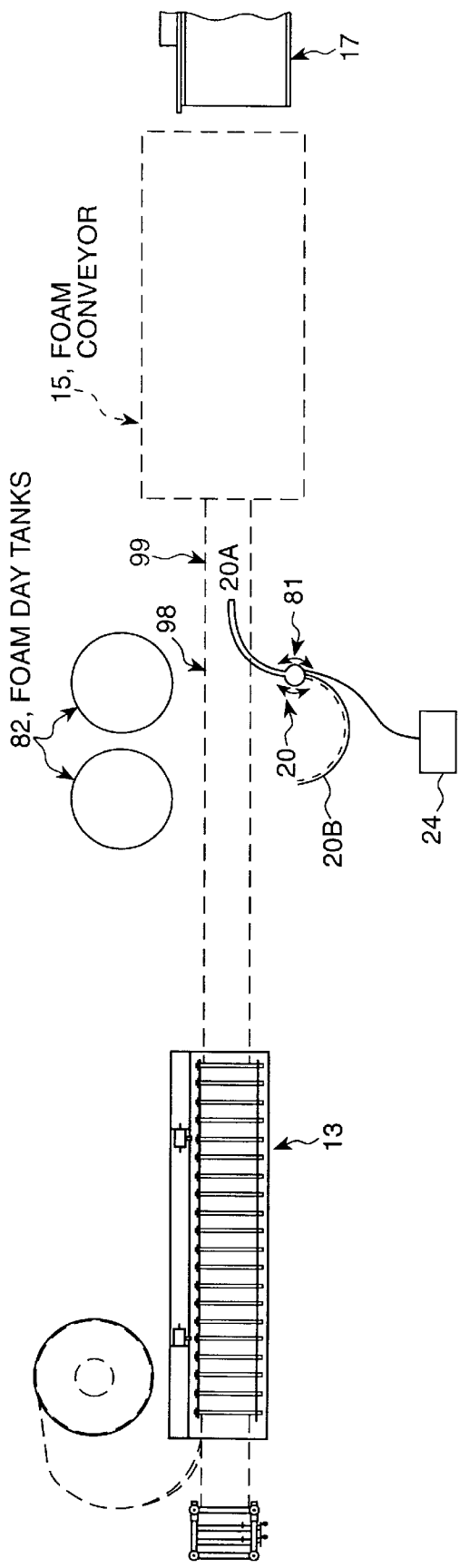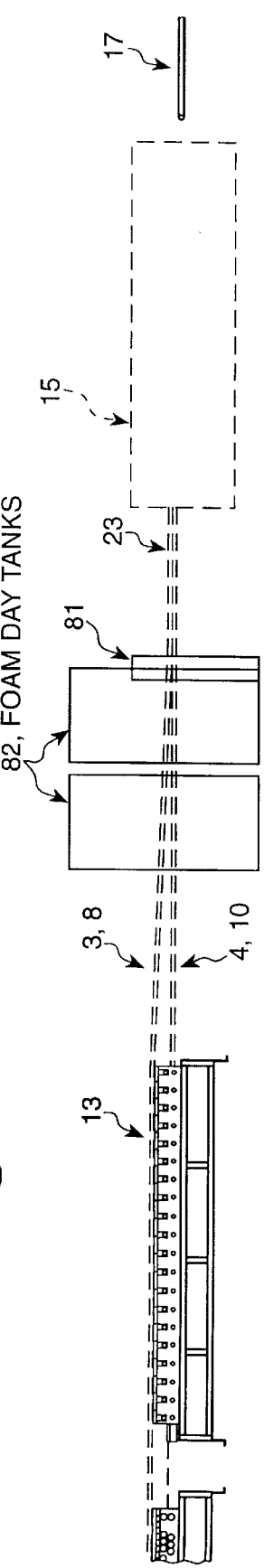

CONTINUOUS METHOD OF MAKING STRUCTURAL FOAM PANELS

FIELD OF THE INVENTION

This invention relates to methods of manufacturing structural foam panels. More particularly, the present invention relates to a continuous manufacturing process for structural foam panels which can be used in the construction of walls in buildings, and for other purposes.

DESCRIPTION OF THE RELATED ART

Structural foam panels of various designs have been made. However, in the past these panels have been made in batch processes only, and not in continuous processes.

For example, U.S. Pat. Nos. 5,373,678 to Hesser; 5,448,865 to Palmersten; 5,381,638 to Andersson; 5,293,728 to Christopher et al.; 5,247,770 to Ting; and 5,743,485 to Ting all show panels with exterior skins and interior foams. All these panels have been in the past made by batch processes, not continuous processes.

In general, continuous processes tend to be cheaper per unit made and have better quality control than batch processes. Also, continuous processes tend to be easier to automate, computerize, accelerate, and scale up in volume. The difficulty with batch processes is conceiving how they may be done.

SUMMARY OF THE INVENTION

In view of the foregoing, there exists a need in the art to provide a continuous manufacturing process for structural foam panels. This has never been done prior to the present invention, despite a long-standing need.

Another object of the present invention is to provide an continuous manufacturing process which can facilitate the large volume manufacturing of the foam panels to be used in the building industry.

Another object of the invention is to provide a continuous process assembly line implementing the continuous process to make the panels.

To achieve these and other advantages, and in accordance with the purpose of the invention as embodied and broadly described, the invention includes a continuous assembly process for making structural foam panels including the steps of decoiling the top and bottom skins by decoilers, respectively, releasing top and bottom stiffeners by uncoilers, respectively, feeding each skin to a straightener, threading the top skin and a top stiffener in the first straightener; aligning and partially attaching the top stiffener to the top skin, threading the bottom skin and a bottom stiffener in a second straightener, aligning and partially attaching the bottom stiffener to the bottom skin, feeding both skins including stiffeners, respectively, to roll formers, shaping both skins into a structural shape to form abutting attaching ends, injecting a foam between the shaped skins to form an integrated panel, pressing the integrated panel with a pressure foam conveyor, curing the integrated panel in a oven, and cutting a cured panel according to a specification by a clamp and cut-off saw. The saw may be computer controlled. The computer may hold specifications for the size and shape of finished panels for kits for a variety of buildings. The operator can select a building, and the computer can then control the saw, cutting the continuous panel emerging from the manufacturing line, to cut and number each finished panel to the specified size and shape necessary to complete the kit for the indicated building.

The invention further includes a continuous assembly line for making structural foam panels including decoilers for decoiling the top and bottom skins, uncoilers for releasing top and bottom stiffeners, straighteners for threading and partially attaching the stiffeners to the skins, respectively, roll formers for shaping both skins into a structural shape to form abutting attaching ends, a foam probe for injecting foam between the skins to form an integrated panel, a foam conveyor for pressing the integrated panel, an oven for curing the integrated panel, and a clamp and cut-off saw for cutting the continuous panel to fabricate finished structural foam panels. The assembly line can also include the computer controlling the saw with the database of building kits with specifications for the size and shape of finished panels discussed above.

BRIEF DESCRIPTION OF THE DRAWINGS

FIG. 1 is a top view of a manufacturing line for structural foam panels.

FIG. 2 is a side view of a manufacturing line for structural foam panels.

FIG. 2A illustrates positions assumed by a foam probe.

FIG. 6A and 6B are a top and side views, respectively, of a section of the assembly line showing the position of the foam probe in its inserted and retracted mode.

DETAILED DESCRIPTION OF THE INVENTION AND THE PREFERRED EMBODIMENT

Figure 3A:
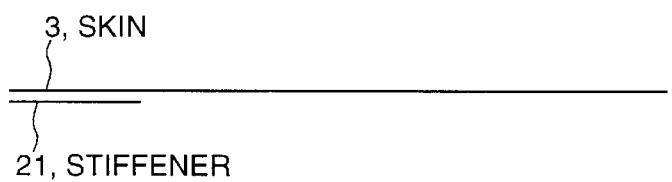
FIGS. 3A–3D show stiffeners aligned and partially attached to top and bottom skins.
Figure 3B:
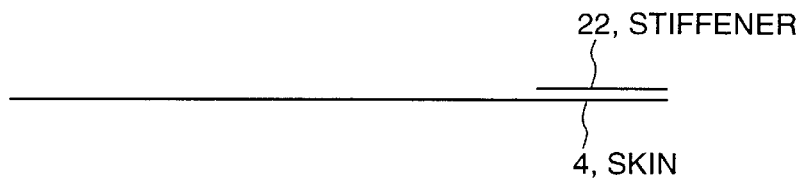

Referring to the drawings, FIGS. 1 and 2 illustrate the process for manufacturing the foam panels and an assembly line for manufacturing the same. FIG. 1 is a top view of the manufacturing line for the process, while FIG. 2 is a side view of the manufacturing line for the process.

Figure 3C:

As shown in FIGS. 1 and 2, a top skin decoiler 1 decoils top skin 3 and feeds the top skin 3 to a first straightener 5, while bottom decoiler 2 decoils bottom skin 4 and feeds the bottom skin 4 to a first roll former 7. Both skins 3 and 4 are made of metal. The top skin 3 is threaded while passing through the first straightener 5. At the same time, a top pallet uncoiler 6 releases a top stiffener 21 to the first straightener 5 and the top stiffener 21 is also threaded while passing through the first straightener 5, and aligned and partially attached to an edge of the top skin 3 as shown in FIG. 3C.

Then, the top skin 3 and the bottom skin 4 are fed to a first roll former 7, respectively. In the first roll former 7, the top skin 3 including the top stiffener 21 is formed into a structural shape to form abutting attaching edges 45 and 46 (See FIGS. 4 and 5). A shaped top skin 8 and the bottom skin 4 are then fed to a second straightener 9.

Figure 3D:

In the second straightener 9, the bottom skin 4 is threaded while passing through the second straightener 9. At the same time, a bottom pallet uncoiler 11 releases a bottom stiffener 22 to the second straightener 9, and the bottom stiffener 22 is also threaded while passing through the second straightener 9, and aligned and partially attached to an edge of the bottom skin 4 as shown in FIG. 3D.

The shaped top skin 8 and bottom skin 4 including the bottom stiffener 22, respectively, are then fed to a second roll former 13 and pressure foam conveyor 15, consecutively. In the second roll former 13, the bottom skin 4 including the bottom stiffener 22 is formed into a structural shape to form abutting attaching edges 45 and 46 (See FIGS. 4 and 5). Before entering into the pressure conveyor, the shaped top skin 8 and the shaped bottom skin 10 are aligned and spaced in a proper dimension.

A spacing between the second roll former 13 and pressure foam conveyor 15 is ranged between 20 feet to 40 feet, and this spacing is particularly important to allow the shaped top skin 8 and the shaped bottom skin 10 to be brought into alignment with an injection of foam 19 (not shown) to form an integrated continuous panel 23. The preferred spacing is 30 feet. The pressure foam conveyor 15 presses the integrated continuous panel 23 which is the integration of the shaped skins 8 and 10 and foam 19 (not shown) which is injected by a foam probe 20.

The foam probe 20 is rotatable 180 degrees on a post 81 and is in a foam injecting position 20A when the shaped skins 8 and 10 are aligned and put on the pressure foam conveyor 15. The foam probe 20 is in a withdrawal position 20B when there are no skins put on the pressure foam conveyor 15. An air cylinder 24 connected to the foam probe 20 rotates the foam probe 20 between the foam injection position 20A and the withdrawal position 20B. The continuous pressed panel 23 is then cured in a oven 25 of the pressure foam conveyor 15.

The foam 19 should be injected where the top skin 3 and bottom skin 4 are as close together as they shall be in the finished product. This is after the stiffeners 21 and 22 have been formed and attached to the skins. This leaves too little space between member 62 and skin 42 (see FIG. 5) through which to insert the foam probe 20.

Hence, the foam probe 20 has a curved shape, as seen in FIGS. 2A and 6A. The probe 20 passes between the stiffeners 21 and 22 at point 98, where the top skin 3 and bottom skin 4 are still farther apart. The probe then curves downstream in the flow of the process while between the top skin 3 and bottom skin 4. The foam 19 (not shown) is then ejected out of the end of foam probe 20 at point 99, where the top skin 3 and bottom skin 4 are closer together. The probe 20 may be rotated out of the way of the conveyor and the skins 3 and 4 to facilitate maintenance and the removal or installation of new rolls of skin 3 and 4.

Figure 7:
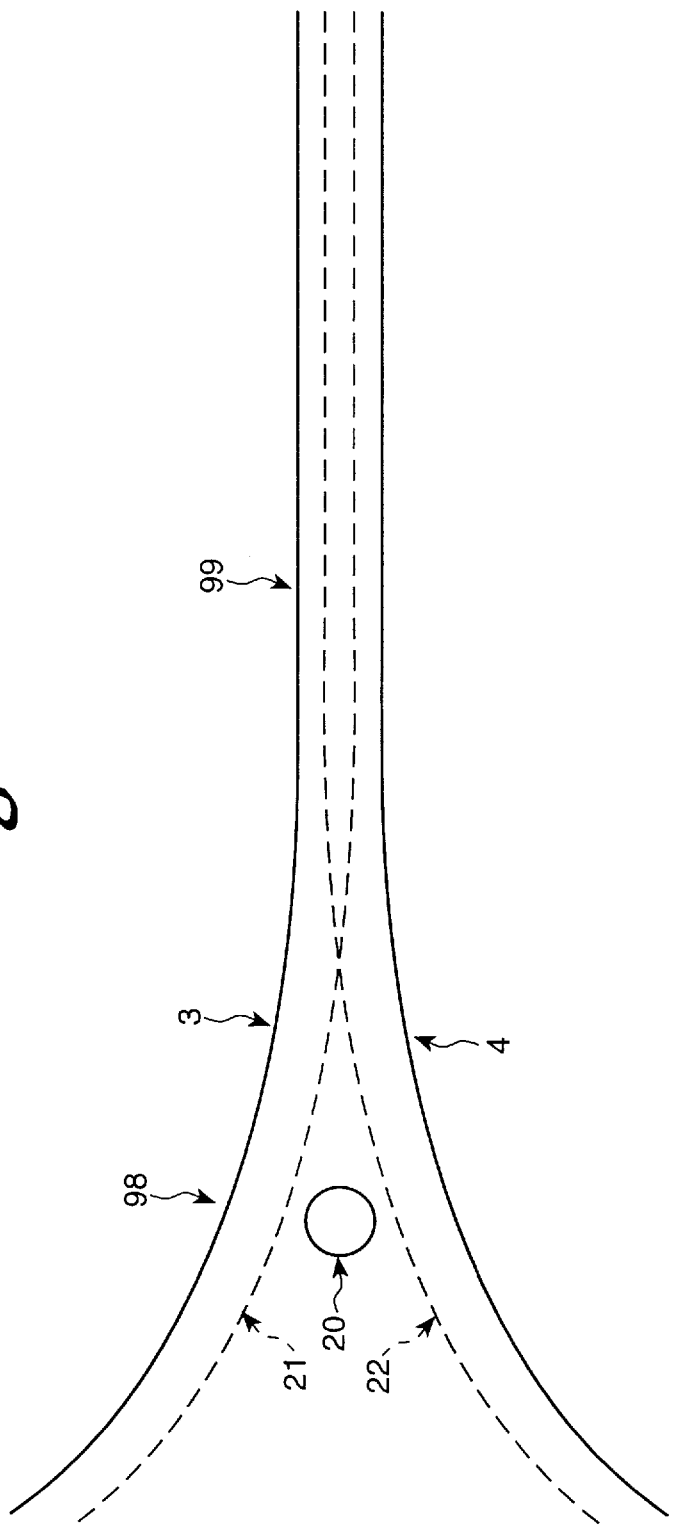
FIG. 7 is a schematic side view showing how the foam probe fits between the skins upstream from where the foam is injected from the end of the probe.

In FIG. 7, probe 20 is shown only in cross-section as it passes between the stiffeners 21 and 22 attached to skins 3 and 4 before probe 20 curves downstream. In FIG. 7, the dotted lines show the outer reaches of stiffeners 21 and 22, showing how, viewed from the side, the stiffeners overlap and leave no room for the insertion of probe 20 at point 99. Foam day tanks 82 are shown which hold the foam 19 prior to injection through probe 20, and are connected to probe 20 with tubes and pumps (not shown).

The continuous cured panel 27 is then conveyed through a run out conveyor 17 to clamp and cut-off saw 18, consecutively. The clamp and cut-off saw 18 cuts the continuous cured panel 27 to the proper size and shape to fabricate finished structural foam panels 29 according to specifications which vary depending on intended usage. The cured panel 27 is still a continuous length of panel running through the manufacturing line until it is cut into discrete panels 29 at the cut-off saw 18. (For convenience of illustration, the panel 23 and 27 is shown as a segment, but it is a connected continuous panel until cut by the saw 18.)

The specifications for cutting the panel 27 are memorized in a computer 25, which communicates with and controls clamp and cut-off saw 18, and thereby controls the cutting activities depending on the specifications and usages. The clamp and cut-off saw 18 also numbers the structural foam panels 29, which are the components and parts for kits for constructing buildings including homes, hotels, and hospitals.

For each type of structure for which the panels are being made, the computer contains the specification for a complete kit of panels for one such structure. The computer 25 then controls the saw 18 to cut the continuous panel 27 into a complete kit of panels 29 for the selected building, numbering each panel to indicate its role in the kit. In this way the product of the continuous process can be a series of full building kits with numbered parts corresponding to the buildings selected.

The process of manufacturing the panels is executed by the continuous process assembly line. Each part of the assembly line executes one or more steps in the process. The assembly line may be computerized, partially computerized, automatic, semi-automatic, or manually controlled.

The continuous process allows economies of scale, lower unit cost, and mass production, when compared with traditional batch processes. The steps in the process include decoiling the top and bottom skins 3 and 4 by decoilers, respectively, releasing the top and bottom stiffeners 21 and 22 by uncoilers 6 and 11, respectively, feeding the skins 3 and 4 to a first straightener 5, threading the top skin 3 and a top stiffener 21 in the first straightener 5, aligning and partially attaching the top stiffener 21 to the top skin 3, threading the bottom skin 4 and a bottom stiffener 22 in a second straightener 9, aligning and partially attaching the bottom stiffener 22 to the bottom skin 4, feeding both skins 3 and 4 including stiffeners 21 and 22, respectively, to roll formers 7 and 13, shaping both skins 3 and 4 into a structural shape to form abutting attaching edges 45 and 46 (see FIGS. 4 and 5), injecting a foam 19 between the shaped skins 8 and 10 to form an integrated panel 23, pressing the integrated panel 23 by a pressure foam conveyor 15, curing the integrated panel 23 in a oven 25, and cutting a cured panel 27 according to a specification by a clamp and cut-off saw.

The discrete finished panels and stiffeners themselves may be manufactured by other processes, including batch processes, and manual processes. The discrete finished panels may be made without use of the continuous assembly line.

FIGS. 3A–3D illustrate a detailed structure of a foam panel before the panel is formed into a structural shape. As shown in FIGS. 3C–3D, the top stiffener 21 and the bottom stiffener 22 are partially attached to the top skin 3 and the bottom skin 4, respectively. The part where the stiffeners 21 and 22 are attached, is then formed into a structural shape to form abutting attaching edges 45 and 46 (see FIGS. 4 and 5).

Figure 4:
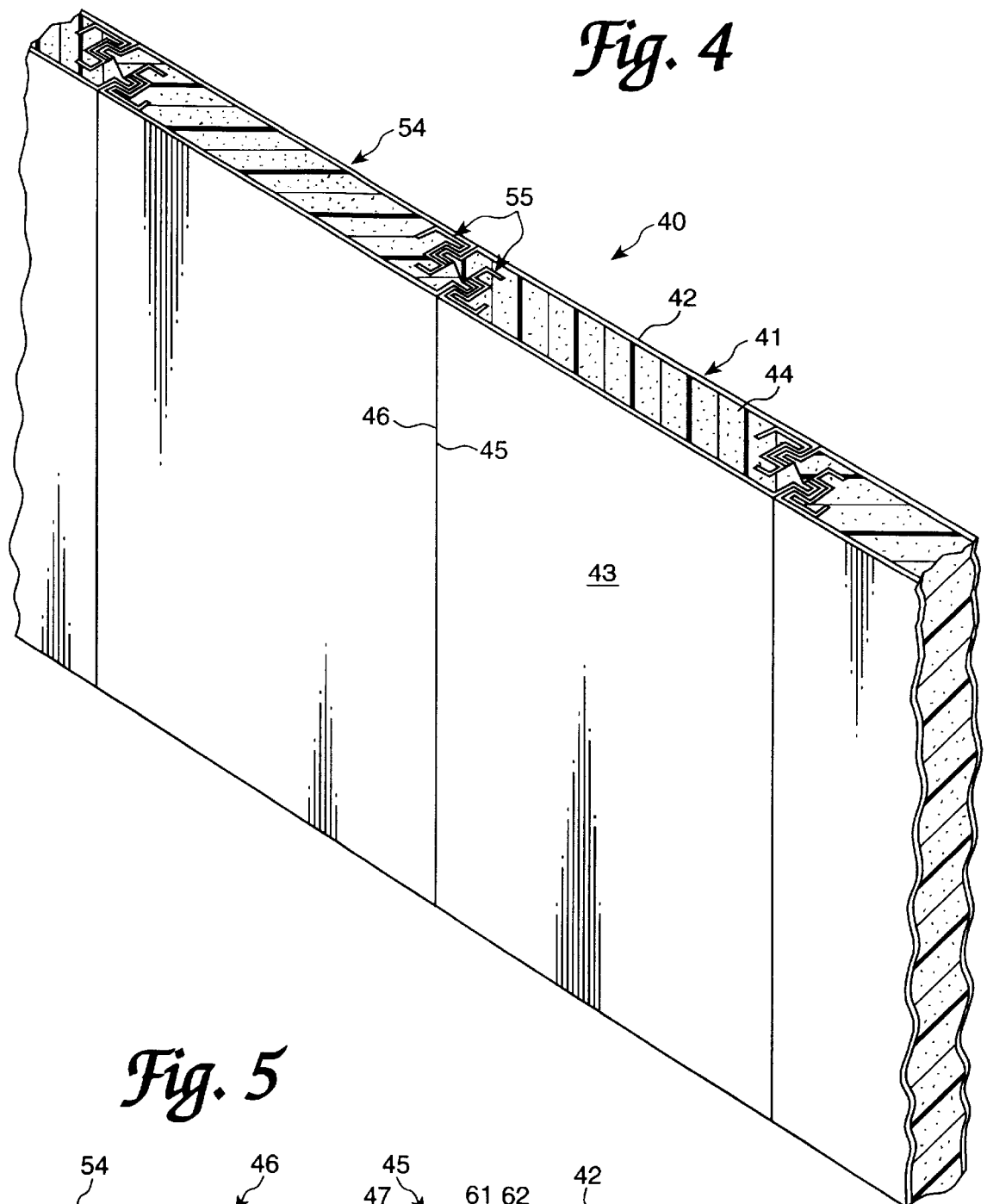
FIG. 4 is a perspective view of a structural wall made up of a plurality of interconnecting structural foam panels.
Figure 5:
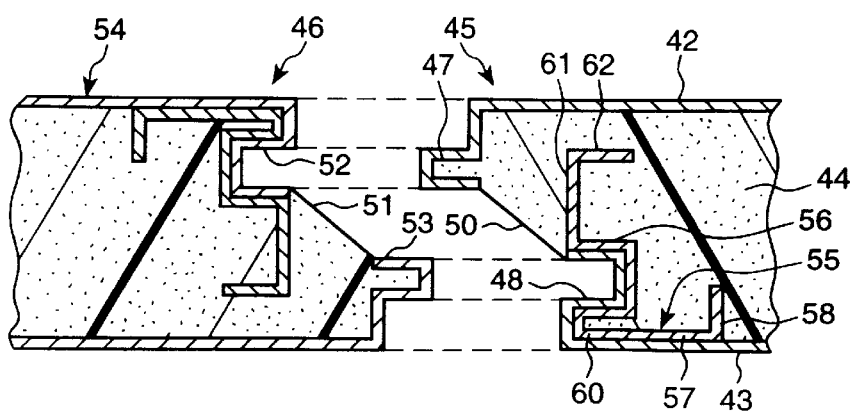
FIG. 5 is a sectional view of a separated pair of abutted panels edges.

The preferred panel to be made at this time is that as shown in FIGS. 4 and 5 hereof, and in U.S. Pat. No. 5,373,678, issued Dec. 20, 1994, by Hesser. However, the continuous manufacturing process and apparatus of the present invention can be used for any type of structural panel with two skins, and a foam core, with or without a stiffener, and related variations.

Referring to the drawings and especially to FIGS. 4 and 5, a structural and insulated wall 40 has a plurality of panels 41 interconnected to each other. Each panel has an outer skin 42 and an inner skin 43 spaced by a uniform thick insulating material which is foam 19, such as a polystyrene or polyurethane rigid foam, to form a lightweight structural panel 29. Each panel has abutting attaching edges 45 and 46. Edge 45 has a metal lined tongue 47 and a metal lined groove 48 in which the metal lining continues from the inner and outer skins 42 and 43. However, the tongue 47 and the groove 48 are spaced from each other to leave an angled insulating material 50 which, when the panels are connected, will press against the insulating material 51 of the next adjacent panel. The panel edge 46 has a metal lined groove 52 which exactly coincides and coacts with the tongue 47 and has a tongue 53 with the metal lined groove 48. Thus, when two panels 41 and 53 are connected, the tongue 47 is inserted into the groove 52 while the tongue 53 is inserted into the groove 48 bringing the exposed insulation 50 and 51 together to provide the seal from the soft flexible material.

At this point, the abutting edge interconnection of the panels has an elongated reinforced metal member 55 which may be a steel or heavy aluminum reinforcing member. Member 55 has a channel portion 56 formed to fit around the metal lined groove 48 in the back thereof, so that the groove 48 is lined all the way around by the reinforcing member 55. Member 55 then has an inner skin attaching portion 57 formed along the inner skin 43 of the panel 41 and has an additional perpendicular extending flange 58. There is a second smaller "W" channel 60 in the reinforcing member 55 and a larger U-shaped portion 61 having an end flange portion 62. Thus, the reinforcing member 55 forms a channel facing lengthwise of the panels as well as transverse to the panels to greatly strengthen the panel in both directions when the panel and reinforcing members are anchored together to a structure.

It should be clear at this point that a structural wall and panel system and especially a panel connecting system has been provided which greatly strengthens both the rigidity of the panels as well as the connection between the panels and the connection of the panels to the header and to the framework for a prefabricated type building.

The embodiments described herein are merely illustrative of the principles of this invention. Other arrangements and advantages may be devised by those skilled in the art without departing from the spirit and scope of the invention. Accordingly, the invention should be deemed not to be limited to the above detailed description but only by the spirit and scope of the claims which follow, and their equivalents.

It is claimed:

1. A method of providing a continuous manufacturing process for making integrated continuous structural foam panels, comprising the steps of:
    (a) decoiling top and bottom skins by decoilers, respectively;
    (b) releasing top and bottom stiffeners by uncoilers, respectively;
    (c) feeding the skins to straighteners, respectively;
    (d) threading the top skin and a top stiffener in the first straightener;
    (e) aligning and partially attaching the top stiffener to the top skin;
    (f) threading the bottom skin and a bottom stiffener in a second straightener;
    (g) aligning and partially attaching the bottom stiffener to the bottom skin;
    (h) feeding both skins including stiffeners, respectively, to roll formers, shaping both skins, including stiffeners, into a structural shape to form abutting attaching edges;
    (i) injecting a foam between the skins by a foam probe to form an integrated continuous panel;
    (j) pressing the integrated continuous panel by a pressure foam conveyor;
    (k) curing the integrated continuous panel in an oven; and
    (l) cutting the integrated continuous panel to form a finished panel according to specifications, by a clamp and cut-off saw.

2. The process in claim 1, further comprising:
    (a) controlling the clamp and cut-off saw with a computer such that the specifications of the cut finished panel match specifications selected from a collection of possible panel specifications stored in the computer.

3. A method of providing a continuous manufacturing process for making integrated continuous structural foam panels comprising the steps of:
    (a) decoiling top and bottom skins by decoilers, respectively;
    (b) feeding said skins to a first straightener and a second straightener, respectively;
    (c) threading the top skin in the first straightener;
    (d) threading the bottom skin in the second straightener;
    (e) feeding both skins respectively, to roll formers, shaping both skins into a structural shape to form abutting attaching edges, each attaching edge having one of said skins for attachment on one side of said edge and a shaped stiffener and second skin for attachment along an opposite side of said edge;
    (f) injecting a foam between the skins by a foam probe to form an integrated continuous panel;
    (g) pressing the integrated continuous panel by a pressure foam conveyor;
    (h) curing the integrated continuous panel in an oven; and
    (i) cutting the integrated continuous panel to form a finished panel according to specifications, by a clamp and cut-off saw.

4. The process according to claim 3, further comprising:
    (j) controlling the clamp and cut-off saw with a computer such that the specifications of the cut finished panel match specifications selected from a collection of possible panel specifications stored in the computer.

* * * * *